United States Patent
Siegemund et al.

(10) Patent No.: US 11,321,851 B2
(45) Date of Patent: May 3, 2022

(54) VEHICULE BASED METHOD OF OBJECT TRACKING USING KANADE LUCAS TOMASI (KLT) METHODOLOGY

(71) Applicant: Aptiv Technologies Limited, St. Michael (BB)

(72) Inventors: Jan Siegemund, Cologne (DE); Daniel Schugk, Cologne (DE)

(73) Assignee: Aptiv Technologies Limited, St. Michael (BB)

( * ) Notice: Subject to any disclaimer, the term of this patent is extended or adjusted under 35 U.S.C. 154(b) by 26 days.

(21) Appl. No.: 16/031,092

(22) Filed: Jul. 10, 2018

(65) Prior Publication Data

US 2019/0026905 A1 Jan. 24, 2019

(30) Foreign Application Priority Data

Jul. 24, 2017 (EP) ..................................... 17182718

(51) Int. Cl.
*G06T 7/00* (2017.01)
*G06T 7/246* (2017.01)
(Continued)

(52) U.S. Cl.
CPC ............ *G06T 7/248* (2017.01); *G06K 9/6215* (2013.01); *G06T 7/277* (2017.01); *G06T 7/40* (2013.01);
(Continued)

(58) Field of Classification Search
CPC ........... G06T 7/248; G06T 7/277; G06T 7/40; G06T 2207/30252; G06T 2207/30261;
(Continued)

(56) References Cited

U.S. PATENT DOCUMENTS 9,251,708 B2 2/2016 Rosenbaum et al.
10,019,805 B1 * 7/2018 Robinson ................. G08G 1/04
(Continued)

FOREIGN PATENT DOCUMENTS

CN 101147159 A 3/2008
CN 101308607 A 11/2008
(Continued)

OTHER PUBLICATIONS

Sun Wei et al: "Learning based particle filtering object tracking for visible-light systems", May 15, 2015, pp. 1830-1837.
(Continued)

*Primary Examiner* — Pakee Fang
(74) *Attorney, Agent, or Firm* — Sawtooth Patent Group PLLC

(57) ABSTRACT

A method of tracking an object of interest between temporally successive images taken from a vehicle based camera system comprising:
a) from an initial image, determining an initial patch with a respective boundary box encapsulating an identified object of interest;
b) using a search template in Kanade Lucas Tomasi (KLT) methodology to track said object of interest in a temporally successive image from said camera system; so as to determine therein a new patch having a respective new boundary box or portion thereof, with respect to said object of interest, characterized in; and
c) performing a check on the robustness of the tracking step in step b) by analyzing one or more parameters output from step b).

18 Claims, 5 Drawing Sheets

(51) Int. Cl.
*G06T 7/40* (2017.01)
*G06K 9/62* (2022.01)
*G06T 7/277* (2017.01)
*G06V 10/25* (2022.01)
*G06V 10/75* (2022.01)

(52) U.S. Cl.
CPC ............ *G06V 10/25* (2022.01); *G06V 10/751* (2022.01); *G06T 2207/30252* (2013.01); *G06T 2207/30261* (2013.01)

(58) Field of Classification Search
CPC ... G06K 9/3233; G06K 9/6202; G06K 9/6215
See application file for complete search history.

(56) References Cited

U.S. PATENT DOCUMENTS

| | | | |
|---|---|---|---|
| 10,275,668 | B1 | 4/2019 | Nuernberger et al. |
| 11,093,762 | B2 | 8/2021 | Siegemund et al. |
| 2008/0002916 | A1* | 1/2008 | Vincent ................. G06T 7/33 382/305 |
| 2010/0289632 | A1* | 11/2010 | Seder ................. G01S 13/723 340/436 |
| 2012/0213412 | A1* | 8/2012 | Murashita ................. G06T 7/50 382/104 |
| 2015/0131858 | A1* | 5/2015 | Nakayama ........... G06K 9/4609 382/103 |
| 2015/0269733 | A1 | 9/2015 | Kosaki |
| 2015/0310624 | A1* | 10/2015 | Bulan ................. G06T 7/215 382/103 |
| 2017/0188052 | A1* | 6/2017 | Chu .................... G06K 9/6202 |
| 2019/0234746 | A1* | 8/2019 | Zhang ................. G01C 21/16 |
| 2019/0362163 | A1 | 11/2019 | Siegemund et al. |

FOREIGN PATENT DOCUMENTS

| | | |
|---|---|---|
| CN | 101635057 A | 1/2010 |
| CN | 104700415 A | 6/2015 |
| CN | 105469427 A | 4/2016 |
| DE | 102016218853 | 3/2018 |
| EP | 2993654 | 3/2016 |

OTHER PUBLICATIONS

Xue Mei et al: Integrated Detection, Tracking and Recognition for IR Video-Based Vehicle Classification:, Jan. 1, 2006, pp. V-745-V-748.

Spampinato C et al: "Evaluation of tracking algorithm performance without ground-truth data", pp. 1345-1348, Sep. 30, 2012.

Lebeda Karel et al: "Long-Term Tracking through Failure Cases", Dec. 2, 2013, pp. 153-160.

"Foreign Office Action", EP Application No. 17182718.1, dated Oct. 29, 2020, 7 pages.

"Non-Final Office Action", U.S. Appl. No. 16/406,356, filed Oct. 20, 2020, 6 pages.

Baker, et al., "Lucas-Kanade 20 Years On: A Unifying Framework", Mar. 2004, 54 pages.

Barth, et al., "Estimating the Driving State of Oncoming Vehicles From a Moving Platform Using Stereo Vision", Dec. 2009, pp. 560-571.

Geiger, "Tracking by Detection", Retrieved at: http://www.cvlibs.net/software/trackbydet/, on Jan. 8, 2021, 2 pages.

Hayword, "Near-Miss Determination Through Use of a Scale of Danger", Jan. 1972, pp. 24-35.

Itay, et al., "A Monocular Vision Advance Warning System for the Automotive Aftermarket SAE", Sep. 29, 2004, 8 pages.

Kim, et al., "Vision-based vehicle detection and inter-vehicle distance estimation", Oct. 2012, pp. 388-393.

Lee, "Boosted Classifier for Car Detection", Jan. 2007, 4 pages.

Ponsa, et al., "Cascade of Classifiers for Vehicle Detection", Aug. 2007, pp. 980-989.

Pyo, et al., "Front Collision Warning based on Vehicle Detection using CNN", International SoC Design Conference, 2016, Oct. 2016, Need Copy.

Ross, et al., "Incremental Learning for Robust Visual Tracking", May 2008, 8 pages.

Shrinival, et al., "Time to Collision and Collision Risk Estimation from Local Scale and Motion", Sep. 2011, pp. 728-737.

Siegemund, "Scale-KLT Vehicle Tracker", Apr. 27, 2016, 8 pages.

Sun, et al., "Monocular Pre-crash Vehicle Detection: Features and Classifiers", Jun. 2006, 14 pages.

Sun, et al., "On-Road Vehicle Detection: A Review", May 2006, pp. 694-711.

Tomasi, "Detection and Tracking of Point Features", Apr. 1991, 22 pages.

"Foreign Office Action", EP Application No. 18174495.4, dated May 27, 2021, 6 pages.

"Foreign Office Action", CN Application No. 201810811187.1, dated May 28, 2021, 24 pages.

"Notice of Allowance", U.S. Appl. No. 16/406,356, filed Apr. 19, 2021, 9 pages.

"Foreign Office Action", CN Application No. 201810811187.1, dated Jan. 30, 2022, 17 pages.

* cited by examiner

VEHICLE BASED METHOD OF OBJECT TRACKING USING KANADE LUCAS TOMASI (KLT) METHODOLOGY

TECHNICAL FIELD OF INVENTION

The invention relates to a vehicle based tacking system where a host vehicle is equipped with a camera system which tracks objects of interest such as other vehicles over time.

BACKGROUND OF INVENTION

A fundamental task of camera based Advanced Driver Assistance Systems (ADAS) applications, e.g. Forward Collision Warning (FCW), Pedestrian Detection (PED), or Traffic Sign Recognition (TSR), is to temporally track of objects of interest, such as vehicles or pedestrians.

In this application, the methodology embodies optical tracking which can be regarded as continuous position estimation of an image region (covering the projection) of a particular object of interest in successive camera frames, i.e. images. For efficiency on complexity reasons, this image region is generally assumed to be box (rectangular shaped) shaped.

In general, two tracking concepts are used in ADAS applications. In a first approach is used a tracking-by-detection method where the object of interest position is detected from scratch for every frame based on a pre-trained model capturing the representative semantics of the target object's class. Tracking of particular class instances is then performed via assignment of detections in successive frames. While relatively robust against sudden light condition changes, the concept may suffer from mis-assignments, missing detections and volatile box trajectories, where the latter may render fuzzy objectives such as Time To Contact (TTC) estimation impossible.

An alternative approach is to model the actual appearance of an individual object instance in a template (template tracking) that is to be redetected in every frame as discussed by Carlo Tomasi and Takeo Kanade in the paper "Detection and tracking of point features", International Journal of Computer Vision, 1991. Knowledge on the actual object appearance compared to information on principle object class semantics in general, allows for a more accurate and dense trajectory determination, giving benefit to TTC estimation task. Approaches differ in complexity of the template model (e.g. constant or highly adaptive as in the paper "Incremental Learning for Robust Visual Tracking" by David Ross, Jongwoo Lim, Ruei-Sung Lin, Ming-Hsuan Yang, from the International Journal of Computer Vision, 2007, as well as the motion model (e.g. 2d shift or affine, e.g. as described in the paper "Lucas-Kanade 20 Years On: A Unifying Framework" by Simon Baker, kin Matthews, International Journal of Computer Vision, 2004. Due to the missing semantic information, this concept suffers from model violations as static models may lose track quite early and dynamic/adaptive models tend to drift away from the original object of interest. Thus, template and motion model need to be chosen appropriate for the respective application, while further a robust and strict self-evaluation is needed in order to detect track loss.

In general, hybrid systems are used to combine advantages of both concepts. Tracking vehicles and bikes from a moving platform for the purpose of intending collision warning imposes multiple requirements on the tracker design: there must be an adequate model for the objects motion dynamics, be sufficiently dynamic to allow for tracking and prediction of characteristic motion, and sufficiently filtered to enable smooth TTC estimation.

The capability of tracking algorithms for TTC estimation is highly dependent on their precision with respect to the estimated the object of interest bounding box, as TTC in principle is derived from the proportion of the bounding box width and the width change over time. While purely detection based approaches tend to result in long-time stable but volatile results even when employing restrictive filters, template matching allows for a subpixel precise estimation of the bounding box position and extent if designed suitable for the designated application.

It is an object of the invention to provide methodology which has improves accuracy and robustness.

Further there should be adequate template representation, and the method should be sufficiently dynamic to cope with small appearance changes and well as sufficiently filtered to minimize drift. There should be stringent self-evaluation to detect drift and track loss, and the method should allow objects to be tracked with bounding box partially out of image.

SUMMARY OF THE INVENTION

In one aspect is provided method of tracking an object of interest between temporally successive images taken from a vehicle based camera system comprising:

a) from an initial image (1), determining an initial patch (2) with a respective boundary box (3) encapsulating an identified object of interest;

b) using a search template in Kanade Lucas Tomasi (KLT) methodology to track said object of interest in a temporally successive image from said camera system; so as to determine therein a new patch (11) having a respective new boundary box (12) or portion thereof, with respect to said object of interest, characterised in;

c) performing a check on the robustness of the tracking step in step b) by analysing one or more parameters output from step b).

The method may include after step a) formulating a patch template (7) of fixed size from said initial patch.

In step b) the search template may be the patch template or is derived or amended therefrom.

Said parameters may be one or more of the following; one or more the co-ordinates, height, width, area or scale of the new bounding box.

Step c) may comprise determining the area, height or width of the newly computed boundary box, and determining if this value is less or more than a threshold.

Step c) may comprise determining with respect to the initial bounding box and newly determined boundary box, the absolute or relative change for one or more of the following: one or more co-ordinates of the initial and new boundary boxes; the width, height or area of the boundary boxes.

The method may include determining if said change is higher or lower than a threshold.

Step c) may comprise determining the amount or percentage of the newly determined boundary box which lies outside the image.

The method may include provided an updated patch template based on the newly determined patch.

The method may include providing a updated search template or revising the search template based on the updated patch template.

Step c) may comprise determining the degree of texture or variance within said newly determined patch, said updated patch template, or said new search template.

Step c) may include determining, for one or more pixels of said newly determined patch, updated patch template or updated search template, the gradient between a pixel parameter and that for one or more neighboring pixels.

In step c) may comprises determining the degree of similarity or difference between any of the following: initial patch, search template or initial patch template, and any of the following: newly computed patch, updated patch template or the updated search template.

Determining the degree of similarity or difference may comprise comparing texture or variance.

The method may comprise determining the degree of similarity or difference between said initial patch template or search template with said newly updated patch template.

The method may include determining the number or proportion of pixels of the updated patch template whose pixel parameter difference to the corresponding pixels in said initial patch template or search template, differ more than a predetermined value.

Said pixel parameters of texture or variance may relate to one of the following: brightness; grey scale, hue or saturation.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention is now described by way of example with reference to the accompanying drawings in which.

DETAILED DESCRIPTION

Figure 1:
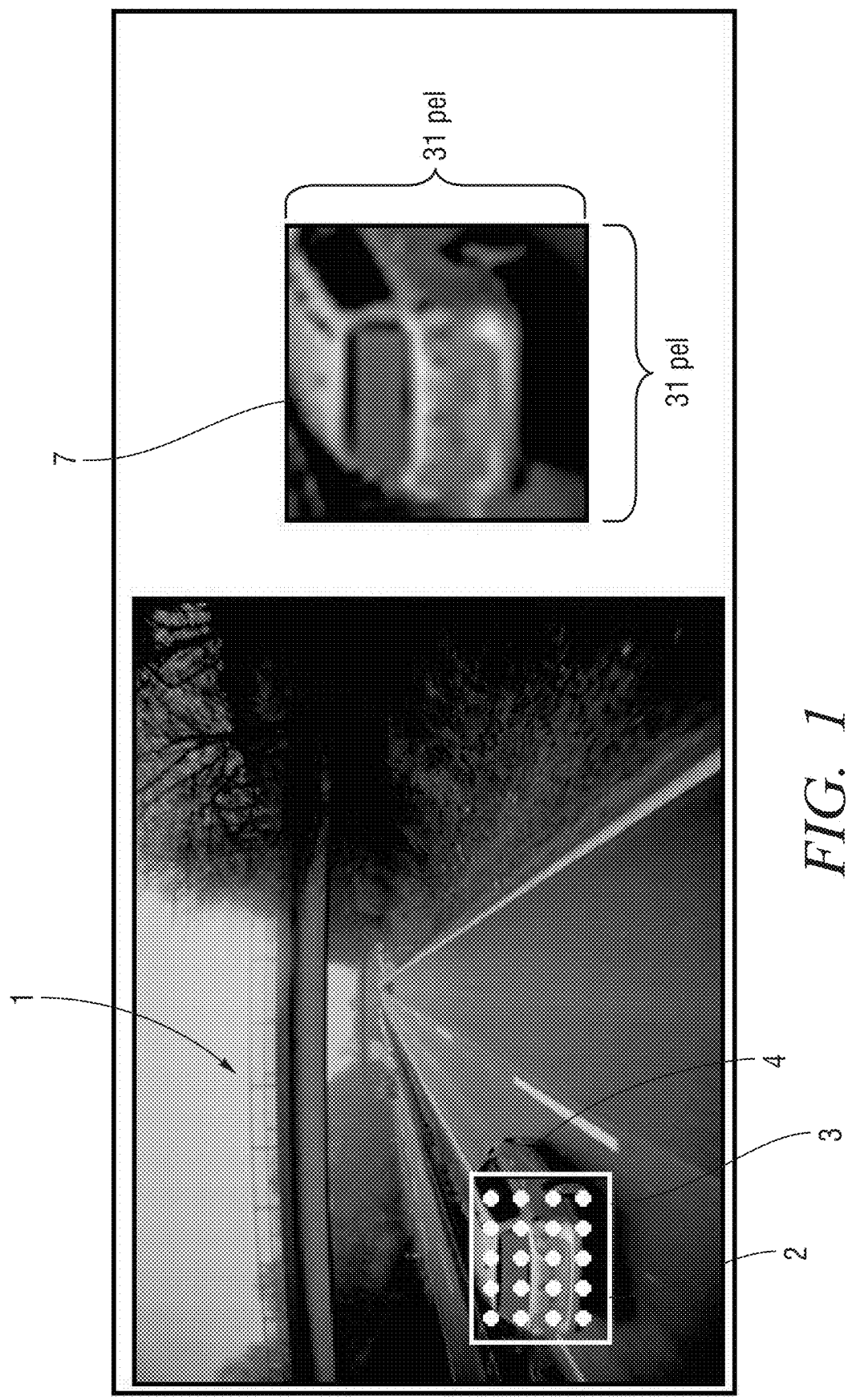
FIGS. 1 and 2 shows a photographic and schematic representations respectively of an initial image 1 taken by a camera mounted on a host or ego vehicle.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A very well-known tracking technique is the Kanade Lucas Tomasi (KLT) tracking method which is described in the first reference paper above.

The invention relates to an improved technique based on e.g. this methodology which provides more robust results. Thus, methodology of the tracking system according to aspects, may be based on the well-known KLT tracker methodology where the methodology is improved to provide increases robustness.

Brief Summary of KLT

Step 1 Initial Patch Extraction

Figure 2:
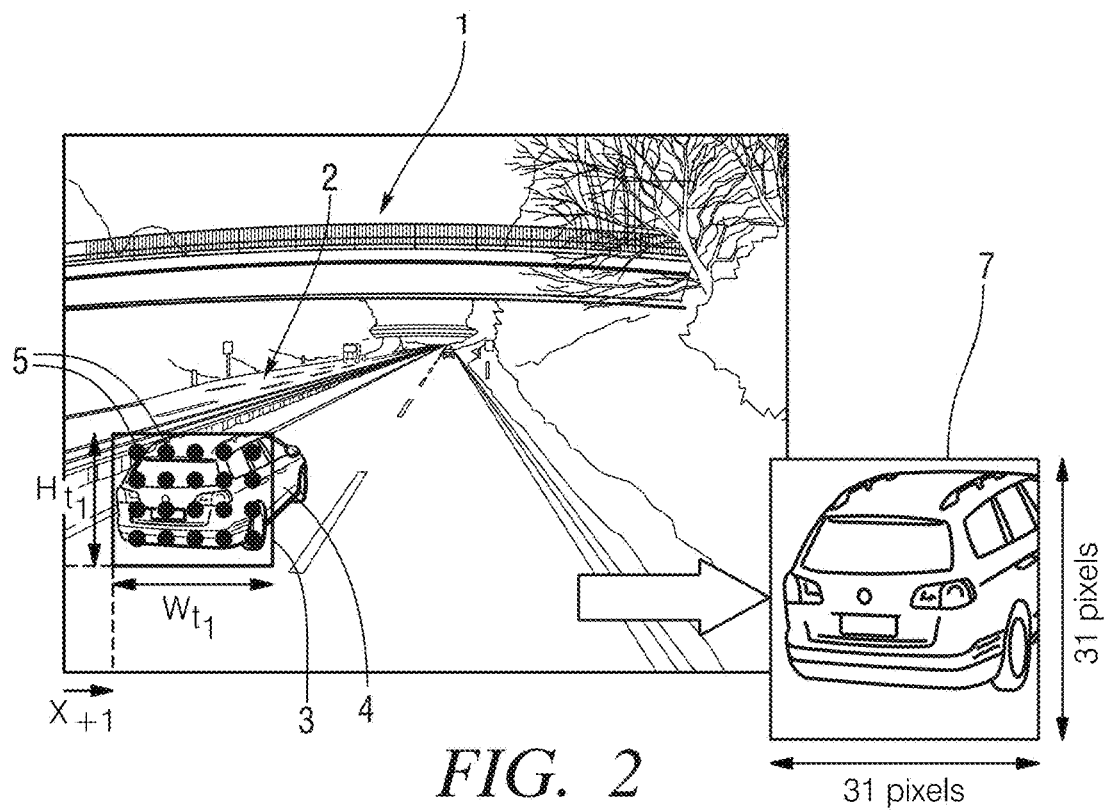

FIGS. 1 and 2 shows a photographic and schematic representations respectively of an initial image 1 taken by a camera mounted on a host or ego vehicle. A region of the image or patch 2 is identified by known techniques (such as by using a search template to scan the whole image), which is shown in the figure being bounded by a rectangular bounding box 3, which encloses an object of interest (here a vehicle 4 in front of a host (ego) vehicle). So, this identified region of interest or patch 2 is used to determine an initial bounding box 3 with respect of an object of interest and can be determined by known image processing techniques e.g. by identifying a cluster of pixels having a particular brightness hue or saturation. Several techniques are well known for identifying objects of interest and thus finding the patch 2 and formulating a bounding box 3 which bounds i.e. encapsulates an object of interest and will not be detailed further here.

The bounding box 3 at this initial time point t1 within the image has a width wt1 height ht1 and will have in the example, reference coordinates relative to the image frame of Xt1 and Yt1. This reference may be taken from the center of the bounding box or a corner point e.g. the bottom left corner. FIG. 2 shows a graphic representation of FIG. 1. Thus, FIGS. 1 and 2 show schematic illustration of patch extraction.

The patch 2 bounded by bounding box 3 comprises a number of pixels N1 designated with reference numeral 5. In FIG. 2 the patch comprises a mesh of 4×4 pixels. In reality the number of pixels will be far higher. So, within the bounding box are a number of pixels N1. The bounding box is the exterior of the region of interest in the original image and the bounding box content is the interior of the bounding box, i.e. all inner pixels in native image resolution. This is referred to as a patch.

A patch template may be formed from the patch. This is described in more detail below in step 2. This can be done by i.e. the patch (the interior of the bounding box) being resampled (e.g. by bilinear interpolation) to a fixed size patch template. (let's call it patch template grid resolution). The patch template may thus be effectively a resized copy of the first patch (thus, in patch template grid resolution) forming the pattern to be redetected in later images. The patch template may be used as the search template for the next image/frame. Alternatively, the search template may be unchanged i.e. the same as before. In another alternative the new search template may be formed from the old search template but updated with patch data; i.e. from the patch template derived from the patch. So the patch template is effectively the patch resized to the same size as the search template, and the new search template would be the old search template refined with the patch template.

Step 2 Forming a Template

The patch which is found and bounded by bounding box can then be converted to a patch template 7 of fixed size—so to provide a new e.g. search template. In the examples the patch template of a fixed size (in this example 31×31 pixel) is thus effectively punched out of the image. Providing the patch template 7 from the patch 2 may be performed using known techniques such as bilinear interpolation, and used to form the patch template 7, which may form the basis of a search template used to search for the object of interest in the next frame i.e. the next image taken by the camera at time point t2, so the object of interest can be tracked. The KLT technique searches in the next image using a search template (e.g. based on the determined previous patch template 7) for a portion of the image that corresponds to the search template.

So in this stage effectively a fixed size patch template 7 is provided from the initial image at time t1 representing, from the image, a specified initial interest region encapsulating the object of interest to be tracked. The converting of the patch 2 within the bounding box 3 to a patch template 7 of fixed size may use known techniques as mentioned.

Figure 3:
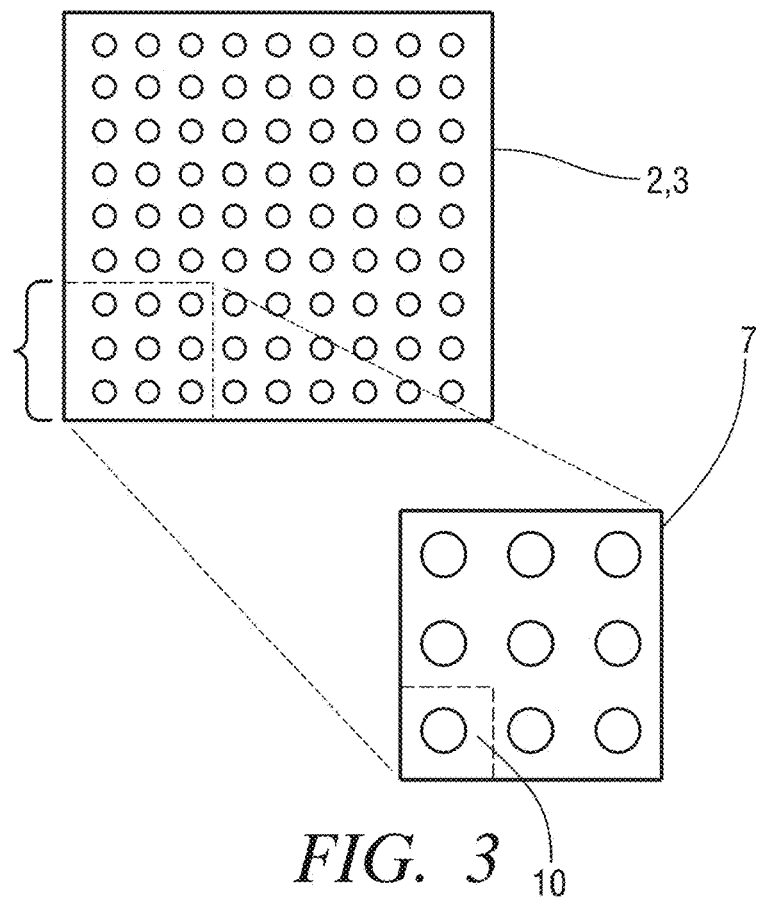
FIG. 3 shows a representation of the transformation, e.g. conversion of the punched out patch (bounding box) to a template of fixed size.

FIG. 3 shows a representation of the transformation e.g. conversion of the punched out patch (bounding box 2) to a patch template 7 of fixed size. The bounding box 3 of the region of interest or patch 2 identified in the initial image (encapsulating the object of interest) has a size of 9×9 pixels and in the example here; the fixed size of patch template 7 is 3×3 pixels. As there are more pixels in bounding box 3 than in the patch/search template, techniques need to be used to provide the relevant pixel parameter (e.g. brightness of each pixel) in the patch template. So, in the example, for pixel 10 of the patch template 7, the pixels in the dotted box 9 in the initial bounding box may be used. An average value of e.g. brightness of the 9 pixels may be used or weighted values may be used. Techniques for this conversion may use known techniques such as bilinear interpolation inducing implicit scale adaption. The initial patch likewise thus embodies the initial template to be tracked in successive images. It may be noted that number of pixels in the initial bounding box (i.e. patch) may be less than that of the fixed size patch template. In the example of FIGS. 1 and 2 the patch/search template has a size of 31 to 31 pixels. So, it is to be understood that the number of pixels in the initial image may be less or more than the number of pixels in the patch/search template. Where there are fewer pixels in the initial bounding box, the parameters of one pixel (brightness) in the initial bounding box 3 in patch 2 may be used to determine that value for several pixels in the patch template 7.

In aspects, the search template may be updated in all successive frames in case matching was performed successful, as weighted mean of the old search template and the newly determined patch template grabbed from the final matched position in the current frame. This keeps rigid structures stable while smoothing out dynamic parts. Therefore, e.g. intensity (gray value) variance of each patch template pixel is computed and stored for each frame at template update step (template variance, see FIG. 6 which will be explained hereinafter).

Step 3 Tracking

In the next step a successive image is taken; i.e. at a later time t2. Images in such systems are typically taken (or processed at small time intervals). The image at the later time interval is then used along with a search template, which may be based on, or updated from, the patch template 7 determined previously i.e. at the preceding time point, to determine a new patch 12 with respective bounding box 11 which encapsulates the object of interest, which may have moved and thus the bounding box therefore may be shifted in x and y co-ordinates and/or become larger or small depending on whether the object of interest is heading towards or away from the host vehicle.

In other words, effectively the new image at later time point t2 is scanned with the search template at different locations and magnification to get a match where the differences (sum of absolute differences) in the brightness of corresponding pixels is at a minimum. This is the function of the KLT tracking methodology. In this way, the shift in the bounding box from time t1 to time t2 within the taken image can be determined as well as the scaling of the bounding box (or increase in height and width of the bounding box).

So, in other words the search template is compared with the later (next image taken by the camera on the host/ego vehicle) image so as to determine a new patch with respective bounding box. To recap, effectively one could consider the method as such that the search template is moved over the new image at different location relative to the image to determine the best match patch/boundary box size and position such that differential of the parameter e.g. differential of brightness of relevant pixels between the patch (or patch template derived therefrom)/search template and the portion of the image is at a minimum. This may entail converting the newly found patch to a patch template of the same size in terms of pixels as the search template used to find it. The actual matching process, i.e. the estimation of the horizontal and vertical displacement as well as the scale change, may be done by non-linear weighted least squares optimization based on the brightness (or other parameter) constancy constraint. Such a technique may be specifically the KLT technique.

Figure 4:
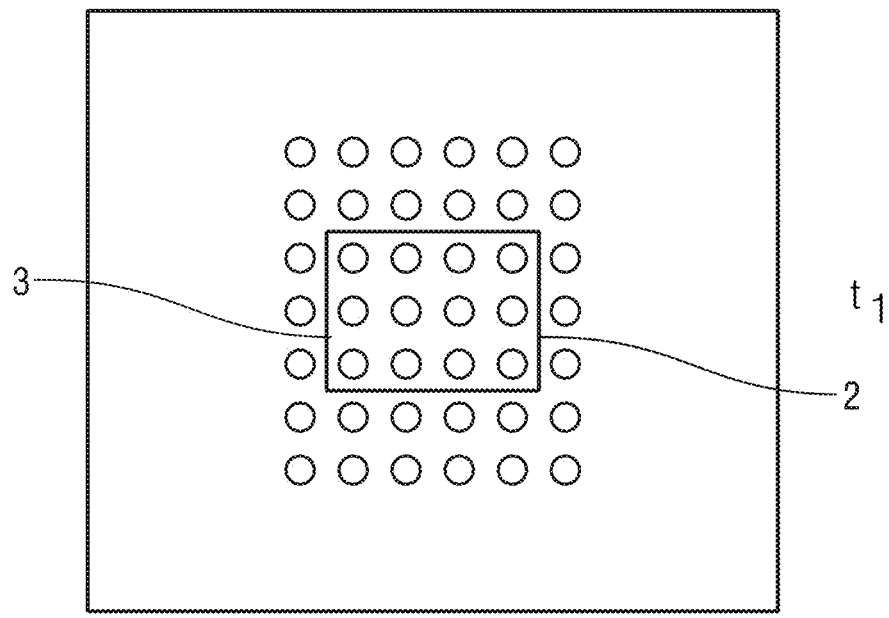
FIGS. 4 and 5 shows the patch (with bonding box) in the first image compared to a patch (with bounding box) found by the KLT technique; in a successive image.
Figure 4:
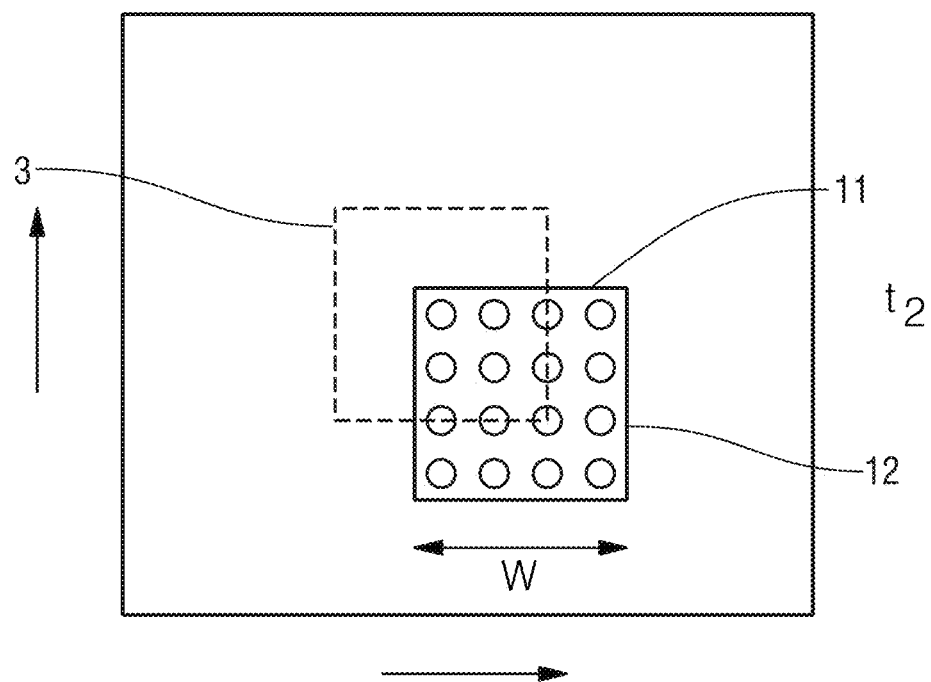

FIG. 4 shows the patch 2 (with bonding box 3) in the first image compared to a patch 11 (with bounding box 12) found by the above technique (using the search template) at an initial time t1 and a later time (e.g. the next frame or image) at time t2. As can be seen the patch 11 found by the KLT technique. As can be seen the initial patch 2 comprises 3×4 pixels and the newly found patch (using template 7) 11 has shifted to the right and down the image and has enlarged and is now 4×4 pixels. This represents the target object (vehicle) moving closer to the host vehicle. So, FIG. 4 shows a schematic representation on the bounding box 3 taken in the image 1 at time point t1 and the subsequent bounding box 12 taken at time point t2 where the bounding box (encapsulating e.g. the object of interest—such as a vehicle) has shifted to the right and has become bigger, indicating that the host vehicle is getting closer to the target vehicle.

Figure 5:
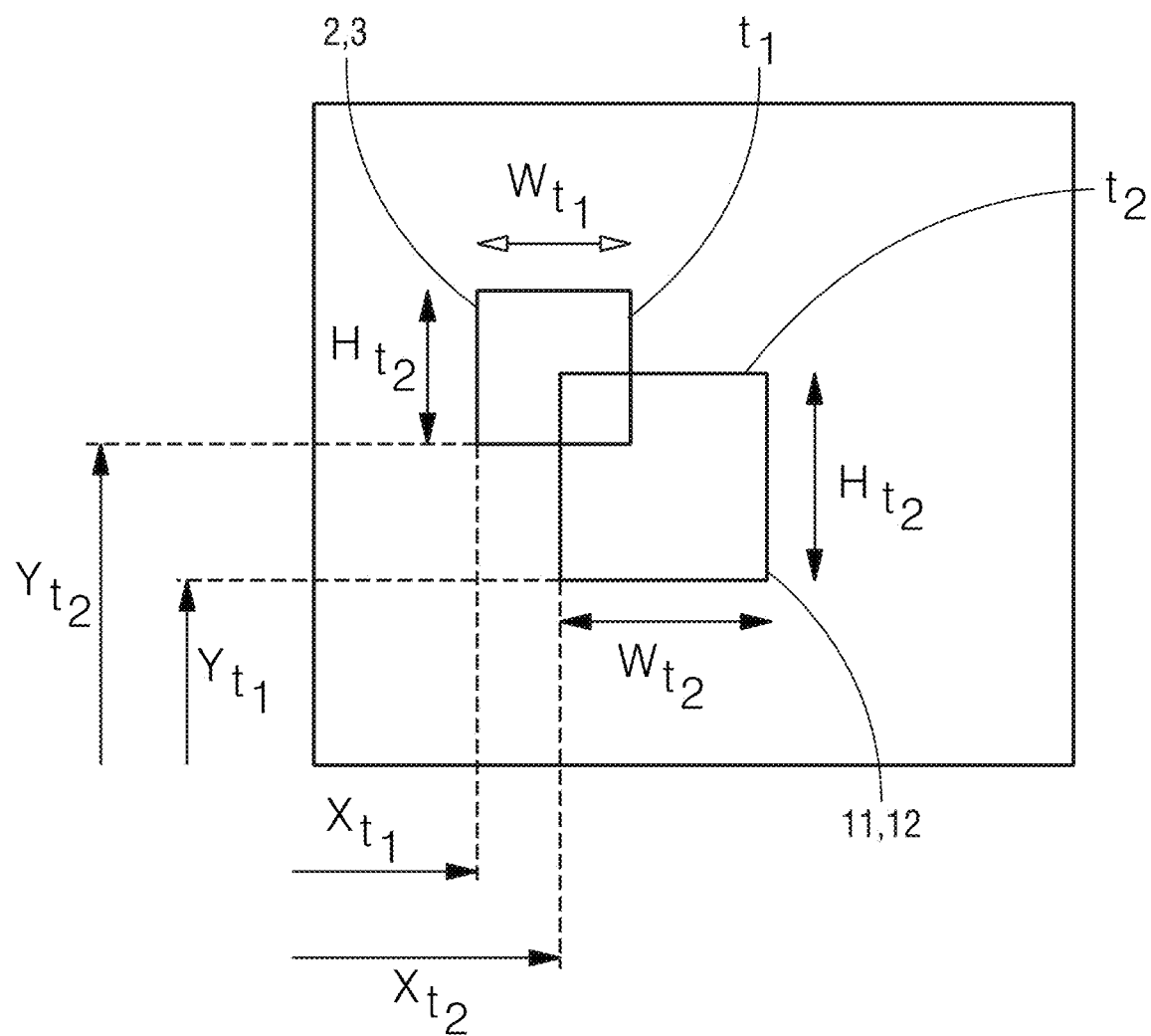

The output parameters of the KLT techniques are thus shown also in FIG. 5 which shows a new bounding box 12 at time t2, having a new width wt2 height ht2 and co-ordinate position in the image Xt2, Yt2. So, FIG. 5 shows the two patches at t1 and t2 (denoted by reference numerals 2 and 11 respectively) together, to compare the size and positions of the boundary boxes of the old and new patches (denoted by reference numerals 3 and 12). It shows a new bounding box 12 of patch 11 at time t2, having a new width wt2 height ht2 and co-ordinate position in the image Xt2, Yt2. Therefore, output parameters of the KLT technique is these new parameters of boundary box e.g. width and height (and/or change therein) and change in position (X and or Y co-ordinates). So, a further output is the change in height and width or change in area. The latter parameters may be regarded as a change in a scaling factor.

It may be assumed in basic embodiments that the bounding boxes of successive images (frame) are of the same shape—this simplifies the methodology—thus other words the height change between frames (successive time points) is the same as the width change, So where this is the case the change in scale of the bounding boxes may be determined (in addition or alternatively) to the change in width Thus important outputs of the KLT technique are the values of the shift in X and Y co-ordinates referred to as $\Delta x$ and $\Delta y$ and shift in scale $\Delta s$.

It is to be noted that the portions of the newly computed boundary box may lie outside the image in other words if the tracked object is a vehicle which has moved partially outside the field of view only a portion of the boundary box will match with a portion of the image. This can cause problems which are solved by aspects of the invention which will be described hereinafter.

Figure 6:
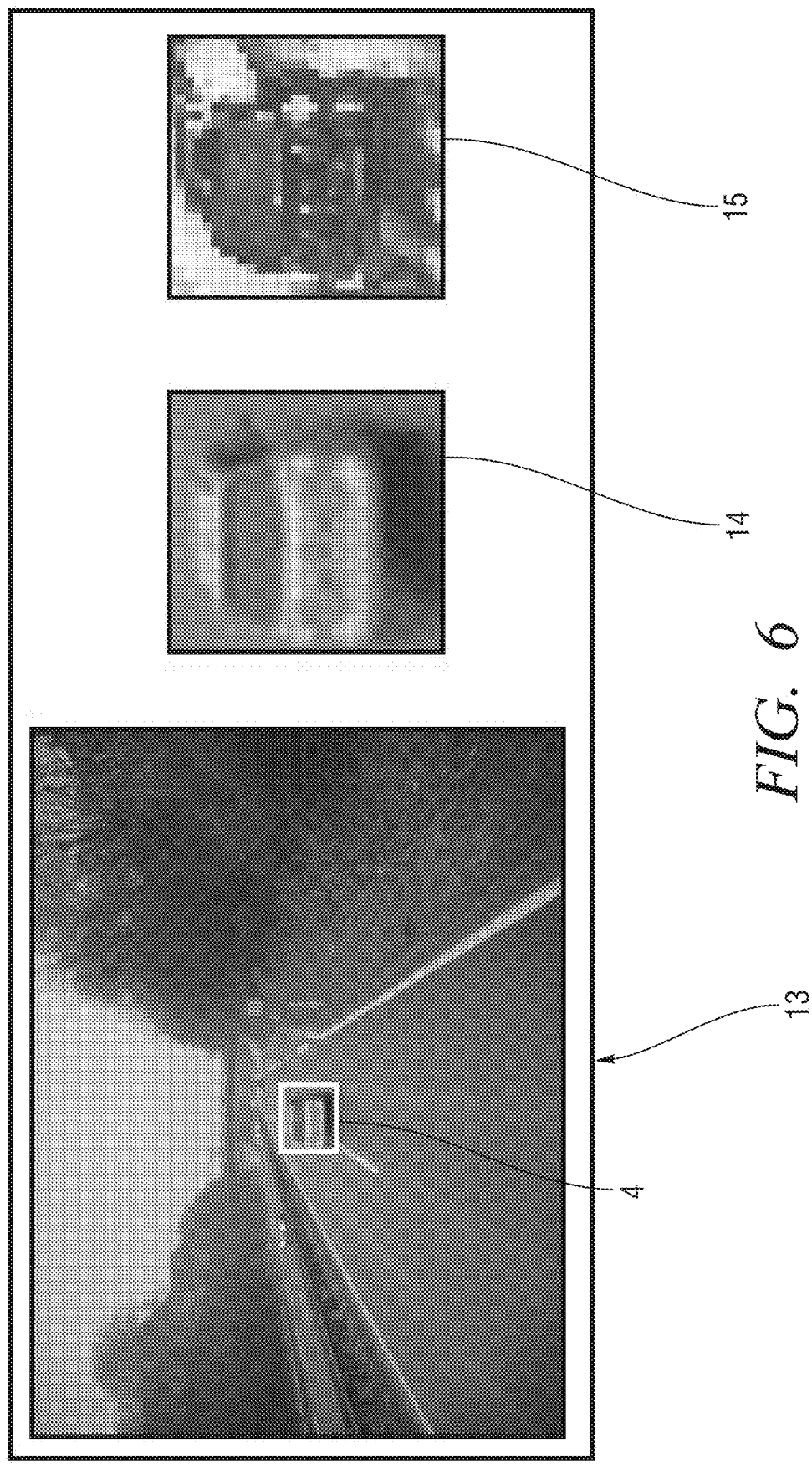
FIG. 6 shows an image of the tracked object of FIG. 1 after several frames.

FIG. 6 shows an image 13 of the tracked object of FIG. 1 after several frames. The patch template 14 formed from the found patch with respect to the object of interest is shown. It is to be noted that the search template of fixed size may be revised i.e. refined according to the appearance of the tracked objects as it will change. This change may be in terms of the shading in the area of the template due to shifts of light, or relative shift in the orientation of tracked vehicle and host vehicle. Reference numeral 15 shows the patch template variance and illustrates the adaption effect of the search template update scheme. Rigid parts appear stable, while dynamic parts such as background smooth out. Patch template variance reveals the local dynamics in more detail, especially for upper background and reflecting parts.

As mentioned, the search template used may be updated by reformulating it based on the newly found patch i.e. from a patch template derived therefrom. For example, the search template may be updated each time from the last found patch/patch template derived therefrom, or be modified based on two or more patches (patch templates thereof) at different time points e.g. the latest patch/patch template and the previous search template.

So to repeat the definitions: a patch refers to the region of interest tracked is found using a search template. A patch template is template which is derived from the patch and is a fixed size, which would normally be the same size as the search template. The search template is the fixed size template used to search for the object of interest in each image. The search template may use a fixed search template or latest formulated patch template. The search template may be updated based on the previous (old) search template and refined by the latest found patch data (i.e. by the latest patch template).

Methodology According to Examples of the Invention

In aspects of the invention, checks are performed, e.g. between successive images (frames) to determine the robustness of the results and to determine whether the tracking results (e.g. between one frame/time point and the next) should be disregarded or flagged as possibly inaccurate. Thus one could consider aspects of the invention to provide a "sanity" check to results obtained in between the KLT cycle. These checks use e.g. parameters which are output from the KLT method.

For example there may be losses and anomalies caused by e.g. drift or temporary occlusions (e.g. by wipers), so in order to yield robustness of the method to detect whether the tracking is realistic, robustness checking steps may be performed on the tracking result of each frame for self-evaluation.

According to examples, robustness checks may use data computed already which is output from e.g. the KLT methodology with respect to the parameters of the initial and subsequent bounding boxes (at times t1 and t2 for example) and parameters of the pixels in the relevant patches of the bounding boxes. In other words a robustness check is performed using as input data, parameters provided by the KLT methodology, in particular changes in parameters of the initial bounding box 3 and the subsequent bounding box 12.

In summary as mentioned these may be shift in x and/or y position of the bounding boxes and/or scale changes. Alternatively, or additionally other parameters or data (e.g. computed at various stages of the KLT method) may be used for the robustness check, such as data pertaining to the pixels within the determined initial and subsequent bounding boxes (patches themselves). Additionally, the check may comprise comparing the newly found patch (which would generally be from the patch template derived therefrom) and the search template which was used to search for it. So, in other words the method may incorporate one or more the following steps, based on estimated bounding box: the structure of the found patch or patch template derived therefrom extracted at the final estimated track pose in current frame.

The following are examples of the robustness check which uses data computed from the KLT algorithm.

a) Tracks (i.e. the tracking result) may be discard tracks which result in too small bounding boxes. So, where the newly computed bounding box 12 of found patch is too small, the track (tracking step) may be discarded. Thus, the absolute size of the bounding box or the size relative to the image may be compared with a threshold and if lower, the track disregarded i.e. ignored. So, the check involve determining the absolute or relative size of new boundary box b) Tracks with unusual (e.g. too large) changes of the bounding box width/height/area between successive images may be discarded (rejected). Here the changes in the absolute or relative width/height or area (i.e. scale) of bounding boxes are computed. Where the change exceeds a threshold the tracks may be disregarded. Preferably relative changes of bounding box parameters between successive time points are determined—thus the ratio of the width, height or area of bounding box is computed with respect to successive images between the two respective time-points. If the ratio therebetween is greater than or smaller than a threshold the tracks may be disregarded. Thus, for example the value of Δs output from the KLT method may be analyzed as an absolute or relative value and the track disregarded if this value exceeds a certain threshold or is less than a certain threshold.

c) In some cases the result of the KLT process will match only a portion of the search template to a patch in the new image, the rest of the newly computed boundary box with respect to the object of interest may lie outside the image. If a proportion of the area in the newly computed boundary box 12 lies outside the image, the track may be disregarded. So, the amount or percentage of the boundary box 12 which lies outside the image may be determined and if greater than a threshold, the track may be disregarded.

d) In one aspect there may be a check for sufficient texture in the the found patch, patch template derived therefrom revised search template (derived from this patch template). As mentioned the search template may be updated by reformulating it from the patch template 7 from the newly found patch 11 so for example the search template may be updated each time from the last found patch 2/patch template thereof. A check can be made on the newly found patch/the patch template derived therefrom or the new (refined) search template (based on the old search template and newly determined patch template) to see if there is sufficient contrast therein, in other words if there is sufficient variation in the level of the parameter (e.g. brightness of pixels within the patch/templates). For example if the object of interest is found based on the rear of a white plain van or lorry without a logo then there is little contrast in patches falling within the border of the edge of the back of the lorry without a darker border region outside the rear of the lorry. If the newly found patch or (revised template derived therefrom) is just a white rectangle with no contrast e.g. no darker border regions, it is not known how much of this area covers the back of the van; i.e. how close the van is to the host vehicle—thus in such circumstances it may be preferable to discard the track. Thus, contrast checks such as gradients checks may be performed on the new patch/patch template derived therefrom or updated search template derived from the computed patch template. This may comprise for example checking if there is sufficient number or proportion of patch/patch template or revised search template pixels with sufficiently large gradient between it and a neighboring pixel, and if not disregarding the track. The term "determining contrast of a patch or template" should thus be interpreted as including such methodology.

With respect to this, there may be a check to see if there are sufficient detectables in the newly found patch or patch template derived therefrom, or indeed any revised template based on the old template and new template. The variance is computed over the template (as it is updated for every new image). The new template to old template difference may then be checked to pixelwise be lower than the old template variance at the specific pixel position. This will be explained in more detail hereinafter.

This check may determine the track is lost (to be discarded if) there are more than τ lost pixels or a proportion of lost pixels in the patch or, preferably in the patch template derived therefrom. Here there is a notion of "detectables" which are denotes pixels with absolute image gradient $$\left|\frac{\partial}{\partial x}\right| + \left|\frac{\partial}{\partial y}\right|$$

exceeding a certain threshold. Overall low gradient will impede successful patch/patch template matching.

e) There may be a check for sufficient similarity between the newly found patch 11 or patch template derived therefrom, or the revised search template, to the (old) search template used to find the patch. Preferably this is done by comparing search template used to find the patch, to the patch template derived from the patch, as the sizes of these templates are the same (same number of pixels). Thus, here may be a check for sufficient number of patch template pixels whose gray value difference to its search template counterparts by e.g. determining if the comparison satisfies a 2-sigma check based on the standard deviation imposed by the template variance. In one example the basic idea of the test is to keep track of the local per-pixel gray value variance $\sigma^2(u; v)$ of the final (most recent) patch template Pt grabbed based on the final estimated pose parameters $\hat{s}_t, \hat{x}_t, \hat{y}_t$ over time and perform a 2–σ (95%-quantile) check for the local patch template-to-search template-difference;

$$|T_t(u,v) - \hat{P}_t(u,v)| < \max(2\sigma(u,v), \sigma_{min}). \quad (11)$$

A $\alpha_{min}$ may be used to create a minimum parameter for the test to consider the low sample size and model non-Gaussian parts. Note that the similarity check may only performed for pixels marked as detectables, as in general changes in the high gradient object outline rather than in homogeneous patch template regions, such as road pixels, indicate the redetection of an object. The term determining the similarity between patch template and search template should be interpreted as including such methodology. This therefore include the notion of determining the differences between a parameter (e.g. brightness) of equivalent/corresponding regions of the newly found patch/template derived therefrom and the search template used to find the patch. This would involve looking e.g. at the differences in the appropriate parameter (e.g. brightness/grey values) between corresponding pixels of the patch template derived from the found patch and the search template (used to search and find the patch).

Where such techniques are used in advanced methodology, the individual patch/patch template/search template pixel weights may possess higher values for center pixels and decrease towards the patch/patch template borders in order to favor object structures in the major interest region and decrease the influence of background structures visible in the bounding box. The weights may be further employed to allow for tracking of objects partially out of image.

Patch/patch template pixels exceeding the image borders may be filled by the respective template pixel value and added to the adjustment with a diminished weight in order to keep the adjustment stable despite the reduced number of observations.

For further stabilization, the scale parameter update may be damped assuming small changes via a Bayesian prior.

A Kalman filter may be used to predict an initial position and scale estimate in every frame based on the previous result. The filter model is preferably specifically designed to support TTC estimation capabilities. The vertical object position may be simply low pass filtered to allow for the highly dynamic changes caused by ego pitch movement.

Horizontal position and box width are filtered using a horizontal planar world model assuming constant acceleration in longitudinal and lateral direction. The world model is connected to the image measurements via pinhole camera model assumption. The unknown object world width is artificially set to one. Although this results in an incorrectly scaled world system, it doesn't affect TTC estimate as the scale vanishes when computing the ratio of widths and width change. As a further novelty, lateral and longitudinal updates are decoupled by canceling the mixed terms in the state transition matrix to minimize the influence of lateral errors on the TTC relevant longitudinal estimate.

As the actual world scale is unknown we refrain from compensating the ego velocity. This however is of minor harm as TTC computation only requires relative speed information. Ego yaw rate, on the other hand, is compensated by computing the resulting individual pixel movement of the box center position employing pinhole model. This yaw rate displacement is deducted from the total observed displacement when updating the Kalman filter state.

Methodology of KLT with Robustness Check
Tracking Assumption

The principle idea of a sKLT (scale-KLT) tracking procedure is based on the object tracking approach of Kanade Lucas Tomasi (KLT). A box shaped object is to be tracked over an image sequence, $I_t$, assuming the visual appearance of the tracked object to stay constant over time. More specifically, for every time step t we assume that when resampling the current object bounding box content to a fixed size U×V-patch template Pt (by bilinear interpolation), this template will match a constant object (search) template T pixelwise. Thus, $$T(u,v) \stackrel{!}{=} P_t(u,v) = I_t(x_t + s_t u, y_t + s_t v) \quad (1)$$

holds for all pixels (u; v) of the patch, where $(x_t; y_t)$ denotes the current bounding box position and $s_t$ the box scale with respect to the image coordinate system.

Linear Tracking Model (Functional Model)

The estimation of the unknown pose parameters relating to the bounding box $s_t$; $x_t$; $y_t$ is performed by solving the non-linear optimization task (1) in a least squares sense. First order Taylor expansion of the right side of the equation yields the linearized model $$T(u,v) \approx I_t(x_t^{(0)} + s_t^{(0)} u, y_t^{(0)} + s_t^{(0)} v) + \quad (2)$$
$$(\partial_x I_t^{(0)}(u,v)u + \partial_y I_t^{(0)}(u,v)v)\Delta s + \partial_x I_t^{(0)}(u,v)\Delta x + \partial_y I_t^{(0)}(u,v)\Delta y,$$

with the approximate pose values (predictions) $s_t(0)$; $x_t^{(0)}$; $y_t^{(0)}$ the updates to $\Delta s$ $\Delta x$ $\Delta y$ and the gradient images. These parameters may be used for the checks for robustness of the track.

$$\partial_x I_t^{(0)}(u,v) = \frac{\partial I_t}{\partial x}(x_t^{(0)} + s_t^{(0)} u, y_t^{(0)} + s_t^{(0)} v) \quad (3)$$

$$\partial_y I_t^{(0)}(u,v) = \frac{\partial I_t}{\partial y}(x_t^{(0)} + s_t^{(0)} u, y_t^{(0)} + s_t^{(0)} v). \quad (4)$$

Using the difference image $\Delta T(u,v)_t^{(0)} = T(u,v) - I_t(x_t^{(0)} + s_t^{(0)} u, y_t^{(0)} + s_t^{(0)} v)$ the final linearized model follows from stacking all template pixels in a common equation system $$\begin{bmatrix} \vdots \\ \Delta T(u,v)_t^{(0)} \\ \vdots \end{bmatrix} = \quad (5)$$
$$\begin{bmatrix} \vdots & \vdots & \vdots \\ \partial_x I_t^{(0)}(u,v)u + \partial_y I_t^{(0)}(u,v)v & \partial_x I_t^{(0)}(u,v) & \partial_y I_t^{(0)}(u,v) \\ \vdots & \vdots & \vdots \end{bmatrix} \begin{bmatrix} \Delta s \\ \Delta x \\ \Delta y \end{bmatrix}$$

$$\Delta T_t^{(0)} = A^{(0)} \Delta p, \quad (6)$$

where the short notation comprises the vectorized difference image $\Delta T_t^{(0)}$ the Jacobian $A^{(0)}$ and the parameter update vector $\Delta p$.

Iterative Parameter Estimation
Adjustment

We search for the parameters optimizing (1) by iteratively solving (6) in a weighted least squares sense, i.e.

$$\Delta p^{(v+1)} = \underbrace{\left( A^{(v)T} W A^{(v)} \right)^{-1}}_{N^{(v)}} \underbrace{A^{(v)T} W \Delta T_t^{(0)}}_{h^{(v)}} \quad (7)$$

yielding the new parameter state $p^{(v+1)} = p^{(v)} + \Delta p^{(v+1)}$ for every iteration. The diagonal weighting matrix W=diag ([: : : ; $w_{u,v}$; : : :] T) induces prior knowledge assuming tracked object to be located in the center of the box, thus down-weighting the pixels from the center to the box border. Note that due to the diagonal structure of W the elements of the normal equation matrix N and the right-side h can be computed by $$N^{(v)} = \sum_{(u,v)} w_{u,v} a_{u,v}^{(v)T} a_{u,v}^{(v)} \quad (8)$$

$$h^{(v)} = \sum_{(u,v)} w_{u,v} \Delta T(u,v)_t^{(0)} a_{u,v}^{v} \quad (9)$$

where $a_{u,v}^{(v)}$, denotes the row of the Jacobian $A^{(v)}$ corresponding to pixel (u; v).

Out-of-Image Handling

Patch template pixels (u; v) beyond the image borders are set to the respective pixel value of the (e.g. search) template position T(u,v) and added to the normal equation system (8) with a diminished weight $w^*_{u,v} = 0.01 w_{u,v}$ to improve adjustment stability.

Scale Parameter Damping and Inversion Stabilizing

In order to stabilize the inversion in (7) we add a small value to the diagonal of the normal equation matrix $N^{(v)} += d_3$ reducing the occurrence of rank defects.

Further, we assume the scale change to be small, i.e. $s_t \stackrel{!}{=} s_{t-1}$. The introduction of this prior in a Bayesian way is easily by damping the parameter update $\Delta s$ via adding a constant damping weight $w_s$ to the respective diagonal position of $N^{(v)}$ In combination, the actual utilized normal equation matrix for (7) reads as $$N^{(v)} = \sum_{(u,v)} w_{u,v} a_{u,v}^{(v)T} a_{u,v}^{(v)} + d_3 + w_s \text{diag}([1, 0, 0]^T). \quad (10)$$

The parameter w is adapted to compete with the terms in (6) due to the number of observations M=UV and their contribution which is bound to the number of gray values K (resulting from the image gradient dependency of the Jacobian). Thus, the parameter is defined by $w_s=\alpha_s MK$ leaving a damping adjustment parameter chosen around the value $\alpha_s=1$.

Robustness Check

1. As mentioned in aspects the KLT methodology is integrated with a robustness check. The robustness check may be designed to discard/ignore the track or allow it dependent on the results of the robustness check. Alternatively, the robustness check may divide the outcome into three or more categories: a three class evaluation of the matching success (robustness check) may classifies the results into valid; bad; lost, whereas the intermediate class bad denotes poor but not totally failed matches.

The test yields the result lost if any of the following condition as are met: bounding box is too small (bad sampling density); scale change is too high (we expect small scale changes); too many patch (or patch template derived therefrom) pixels are out of image; insufficient detectables in patch/patch template, insufficient detectables in the patch/patch template. Similarity check fails for more than $\tau_{\_lost}$ pixels. Otherwise the result bad if similarity check fails for more than a defined number $\tau_{\_bad}$ pixels—otherwise the result valid.

2. Examples of Detectables for Robustness Check

The term detectables denotes pixels with absolute image gradient $$\left|\frac{\partial}{\partial x}\right|+\left|\frac{\partial}{\partial y}\right|$$

exceeding a certain threshold. Overall low gradient will impede successful patch/patch template matching.

3. Example of Robustness Check: Similarity Check

The basic idea of the test is to keep track of the local per-pixel gray value variance $\sigma^2(u; v)$ of the final patch template $\hat{P}_t$ grabbed based on the final estimated pose parameters $\hat{s}_t, \hat{x}_t, \hat{y}_t$ over time and perform a 2-$\sigma$ (95%-quantile) check for the local patch template-to-old (e.g. search) template-difference;

$$|T_t(u,v)-\hat{P}_t(u,v)|<\max(2\sigma(u,v),\sigma_{min}). \quad (11)$$

We use $\sigma_{min}$ to create a minimum socket for the test to consider the low sample size and model non-Gaussian parts. Note that the similarity check is only performed for pixels marked as detectable, as in general changes in the high gradient object outline rather than in homogeneous patch/patch template regions, such as road pixels, indicate the redetection of an object.

Template Adaption

As the appearance of the tracked object may vary over time due to lighting conditions, distance etc., the new search template T is adapted over time by means of low pass filtering. In case the sanity check passes the new template $T_{t+1}$ is interpolated from the old search template $T_t$ and the patch template grabbed based on the final estimated pose parameters $\hat{s}_t, \hat{x}_t, \hat{y}_t$ to $$T_{t+1}=\gamma T_t+(1-\gamma)I_t(\hat{x}_t+\hat{s}_t u,\hat{y}_t+\hat{s}_t v). \quad (12)$$

where the adaption parameter $\gamma\epsilon[0; 1]$ controls the adaption rate.

Template Tracking

We utilize a Kalman filter to stabilize the tracking result based on a filter model designed to support TTC estimation.

Filter Model

Assume the following notation given for bounding box lateral horizontal position x, bounding box width w, object 3d lateral position in camera system $\tilde{X}$ and longitudinal position $\tilde{Z}$, object 3-d width $\tilde{W}$ and focal length f, represented in the rectified normal case of the image geometry such that the equation holds below $$\frac{\tilde{Z}}{f}=\frac{\tilde{X}}{x}=\frac{\tilde{W}}{w} \quad (13)$$

Since the actual object width $\tilde{W}$ is unknown and 3d coordinates are not of direct interest for us in this application we define W=1 and perform all work in the resulting scaled system—see below $$\frac{Z}{f}=\frac{X}{x}=\frac{1}{w} \quad (14)$$

System Model

With the time difference $\Delta t=t_{new}-t_{old}$ the filter model reads as $$Z''_{new}=Z''_{old} \quad (15)$$

$$Z'_{new}=Z''_{old}\Delta t+Z'_{old} \quad (16)$$

$$X''_{new}=X''_{old} \quad (17)$$

$$X'_{new}=X''_{old}\Delta t+X'_{old} \quad (18)$$

$$w_{new}=\frac{f}{\frac{1}{2}Z''_{old}\Delta t^2+Z'_{old}\Delta t+\frac{f}{w_{old}}}=\frac{f}{Z} \quad (19)$$

$$x_{new}=f\frac{\frac{1}{2}X''_{old}\Delta t^2+X'_{old}\Delta t+\frac{x_{old}}{w_{old}}}{\frac{1}{2}Z''_{old}\Delta t^2+Z'_{old}\Delta t+\frac{f}{w_{old}}}=f\frac{\overline{X}}{\overline{Z}}. \quad (20)$$

Using the substitutions $\tilde{X}$ and $\tilde{Z}$, the Jacobian with respect to the parameters is given by $$A=\begin{bmatrix} 1 & 0 & 0 & 0 & 0 & 0 \\ \Delta t & 1 & 0 & 0 & 0 & 0 \\ 0 & 0 & 1 & 0 & 0 & 0 \\ 0 & 0 & \Delta t & 1 & 0 & 0 \\ -\frac{1}{2}\frac{f}{\overline{Z}^2}\Delta t^2 & -\frac{f}{\overline{Z}^2}\Delta t & 0 & 0 & \frac{f^2}{\overline{Z}^2 w_{old}^2} & 0 \\ -\frac{1}{2}f\frac{\overline{X}}{\overline{Z}^2}\Delta t^2 & -f\frac{\overline{X}}{\overline{Z}^2}\Delta t & \frac{1}{2}\frac{f}{\overline{Z}}\Delta t^2 & \frac{f}{\overline{Z}}\Delta t & \frac{\frac{fx_{old}}{\overline{Z}w_{old}^2}+\frac{f^2X}{\overline{Z}^2 w_{old}^2}}{0} & \frac{f}{\overline{Z}w_{old}} \end{bmatrix}. \quad (21)$$

Note that setting the mixed terms in the last row to zero decouples x and w appears to yield more stable result especially with respect to TTC estimation as lateral influence is suppressed.

Observation Model

The presented formulation of the system model allows for an quite simple integration of the observations $w_{obs}$; $x_{obs}$ achieved by template tracking $$w = w_{obs} \tag{22}$$

$$x = x_{obs}, \tag{23}$$

with the Jacobian $$H = \begin{bmatrix} 0 & 0 & 0 & 0 & 1 & 0 \\ 0 & 0 & 0 & 0 & 0 & 1 \end{bmatrix}. \tag{24}$$

Filtering of Vertical Image Position

The vertical object position is simply low pass filtered to allow for the highly frequent changes caused by ego pitch movement.

Egomotion Compensation

As the actual world scale is unknown we refrain from compensating the ego velocity. This however is of minor harm as TTC computation only requires relative speed information. Ego yaw rate β is compensated by computing the resulting individual pixel movement $\Delta x_{ego}$ of the box center position x employing the pinhole model, $$\tilde{x} = \cos(\Delta t \beta) x - \sin(\Delta t \beta) f \tag{25}$$

$$\tilde{f} = \sin(\Delta t \beta) x + \cos(\Delta t \beta) f \tag{26}$$

$$\Delta x_{ego} = \tilde{x} \frac{f}{\tilde{f}} - x. \tag{27}$$

The displacement $\Delta x_{ego}$ is deducted from the total observed displacement when updating the filter parameters.

TTC Estimation

Constant Velocity TTC

Assuming constant velocity (Z"=0) TTC estimation is based on the formula $$0 = \tilde{Z} + \tilde{Z}' t_{TTC} \tag{28}$$

$$\Leftrightarrow t_{TTC} = -\frac{\tilde{Z}}{\tilde{Z}'}. \tag{29}$$

From substitution of Z using relation (13) and with the derivative $$\tilde{Z}' = -\frac{f\tilde{W}}{w^2} w'$$

the unknown width $\tilde{W}$ vanishes and the TTC can be entirely represented in terms of the Kalman state parameters $$t_{TTC} = \frac{f}{Z'w}. \tag{30}$$

Constant Acceleration TTC

Constant acceleration assumption induces a slightly more complicated procedure. It demands solving $$0 = \tilde{Z} + t_{TTC}\tilde{Z}' + \frac{1}{2} t_{TTC}^2 \tilde{Z}'' \tag{31}$$

For $t_{TTC}$

Assuming $\tilde{Z}'' \neq 0$ allows for reshaping to $$0 = t_{TTC}^2 + 2 t_{TTC} \frac{\tilde{Z}'}{\tilde{Z}''} + 2 \frac{\tilde{Z}}{\tilde{Z}''} \tag{32}$$

$$0 = t_{TTC}^2 + 2 t_{TTC} \frac{Z'}{Z''} + 2 \frac{Z}{Z''}, \tag{33}$$

whereas the transformation follows from canceling out the unknown object width $\tilde{W}$. The solution results from applying pq-Formula $$t_{TTC} = \frac{-Z' \pm \sqrt{Z'^2 - 2ZZ''}}{Z''} \tag{34}$$

and can again be represented in terms of the Kalman state parameters using relation 13.

$$t_{TTC} = \frac{-Z' \pm \sqrt{Z'^2 - \frac{2fZ''}{w}}}{Z''}. \tag{35}$$

From both solution candidates, choose the smaller non-negative value if exists.

Distance to Front Bumper Integration

TTC computation described in the previous sections yields the time to contact of object to camera. This embodies a good approximation to vehicle contact time in case the distance of camera to front bumper is small (such as for at nose trucks). Otherwise the bumper to camera distance induces a distinct bias especially if when the distance to the object is small. To correct this bias, the actual width of the object $\tilde{W}$ needs to be known to transfer front-bumper-to-camera distance $d_{bump}$ into the Kalman filter 3d space.

For constant velocity assumption the bias correction is given by $$t_{TTC} \mathrel{+}= \frac{d_{bump}}{Z'\tilde{W}}. \tag{36}$$

For constant acceleration assumption the set must be considered in the square root part of (35)

$$t_{TTC} = \frac{-Z' \pm \sqrt{Z'^2 - 2Z''\left(\frac{f}{w} - \frac{d_{bump}}{\tilde{W}}\right)}}{Z''}. \tag{37}$$

While this invention has been described in terms of the preferred embodiments thereof, it is not intended to be so limited, but rather only to the extent set forth in the claims that follow.

We claim:

1. A method of tracking an object of interest between temporally successive images taken from a vehicle-based camera system comprising:
   a) from an initial image, determining an initial patch with an initial bounding box encapsulating an identified object of interest;
   b) using a search template based on the initial patch to track, using Kanade Lucas Tomasi (KLT) methodology, the object of interest in a temporally successive image from the camera system and determine therein a new patch having a new bounding box or portion thereof with respect to the object of interest;
   c) performing a check on a robustness of tracking the object of interest in step b) by:
      analyzing one or more parameters output from step b), the one or more parameters including at least one bounding box parameter of the new patch comprising: a height, a width, or an area; and
         determining a degree of similarity or difference between the search template and an updated patch template based on the new patch by at least performing a comparison of the search template to the updated patch template in order to compute local differences, the comparison keeping track of a local per-pixel gray value variance over time of the updated patch template and checking for a sufficient number of updated patch template pixels whose computed local differences satisfy a check by comparing with respective values derived from the per-pixel variances.

2. The method as claimed in claim 1 including after step a) formulating the updated patch template from the initial patch using a fixed size.

3. The method as claimed in claim 2 wherein in step b) the search template is the initial patch or is derived or amended therefrom.

4. The method as claimed in claim 1 wherein said one or more parameters further comprise at least one of: one or more co-ordinates or scale of the new bounding box.

5. The method as claimed in claim 1, wherein step c) further comprises:
   determining if the area, height, or width is less or more than a threshold.

6. The method as claimed in claim 1 wherein step c) further comprises:
   determining, with respect to the initial bounding box and the new bounding box, an absolute or relative change for one or more of: one or more co-ordinates of the initial and new bounding boxes, the width, the height, or the area of the initial and new bounding boxes.

7. The method as claimed in claim 6 including determining if the absolute or relative change is higher or lower than a threshold.

8. The method as claimed in claim 1, wherein step c) further comprises:
   determining an amount or percentage of the new bounding box which lies outside the temporally successive image.

9. The method as claimed in claim 1, further comprising:
   providing an updated search template or revising the search template based on the updated patch template.

10. The method as claimed in claim 1, wherein step c) further comprises:
    determining, for one or more pixels of the new patch, the updated patch template, or an updated search template, a gradient between a pixel parameter and one or more neighboring pixels, wherein the pixel parameter relates to at least one of brightness, gray scale, hue, or saturation.

11. The method as claimed in claim 10, wherein a value derived from the variance computed over time individually for each of the one or more pixels of the updated patch template is compared to a difference between the updated patch template and the search template.

12. The method as claimed in claim 10 wherein the gray value variance relates to at least one of brightness, grey scale, hue, or saturation.

13. The method as claimed in claim 1 further comprising using a Kalman filter for stabilizing a tracking result of tracking the object of interest, lateral and longitudinal state updates corresponding to a lateral position and the width of the bounding box parameter of the object of interest are decoupled by cancelling mixed terms in a state transition matrix of the Kalman filter.

14. The method as claimed in claim 1, wherein the local per-pixel grey value variance is compared to the difference between the updated patch template and the search template.

15. The method as claimed in claim 1, wherein step d) further comprises:
    determining to discard the new patch based on comparing the local per-pixel grey value variance.

16. The method as claimed in claim 1, wherein step c) further comprises:
    categorizing the robustness of tracking said object of interest into at least three categories of matching success, the at least three categories comprising:
    a valid match;
    an intermediate match; and
    a failed match.

17. The method as claimed in claim 1, wherein step c) further comprises:
    determining, based on the height, the width, or the area, that a size of the new bounding box is smaller than a threshold; and
    determining to discard the new patch based on the size of the new bounding box is smaller than the threshold.

18. The method as claimed in claim 1, wherein the sufficient number of updated patch template pixels whose computed local differences satisfy a check is based on a standard deviation of a local per-pixel gray value variance over time of the updated patch template.

* * * * *